Patented Mar. 1, 1949

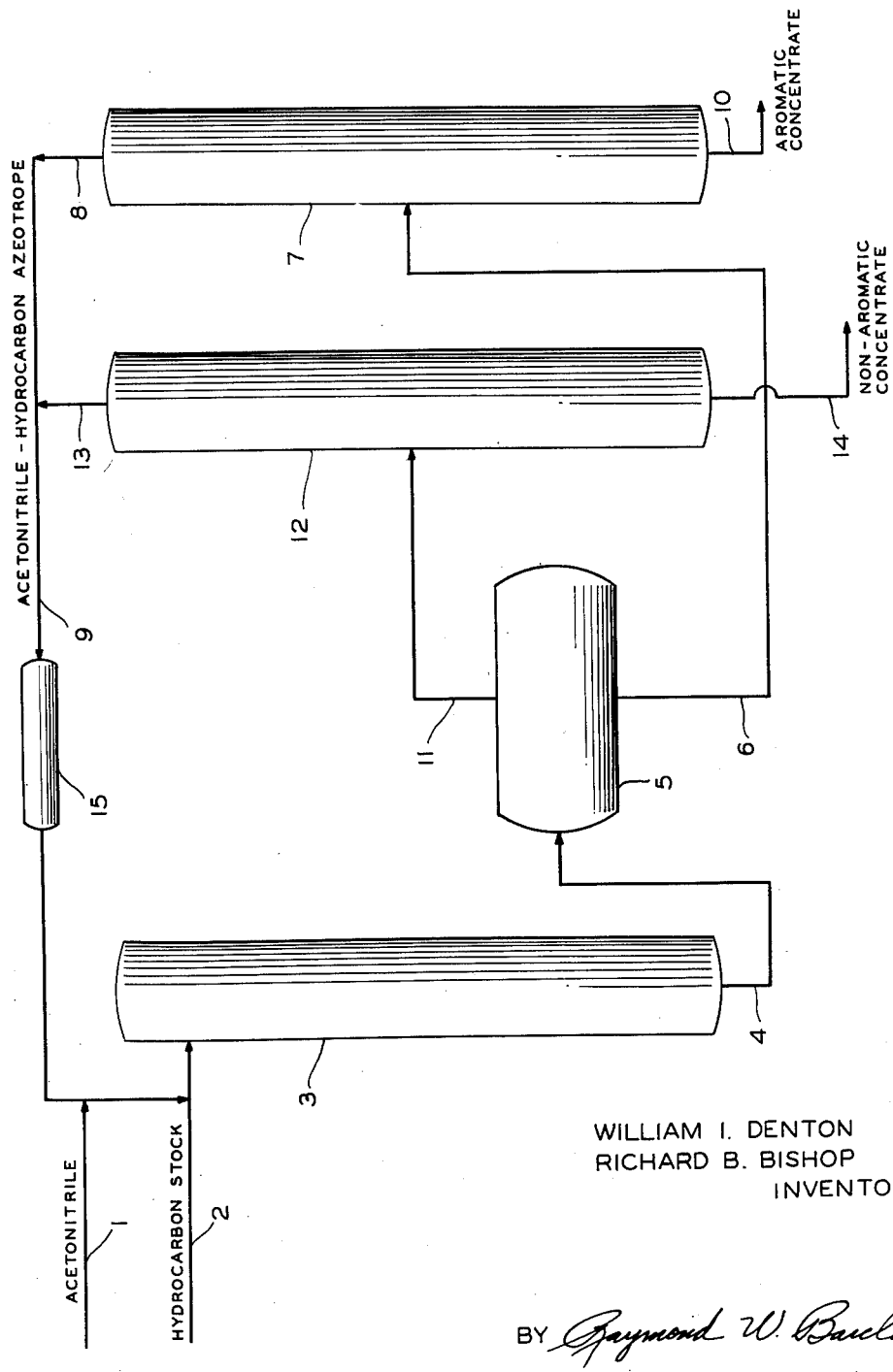

2,463,479

UNITED STATES PATENT OFFICE 2,463,479

PREPARATION OF AROMATIC SOLVENTS

William I. Denton, Woodbury, and Richard B. Bishop, Haddonfield, N. J., assignors to Socony-Vacuum Oil Company, Incorporated, a corporation of New York Application December 6, 1946, Serial No. 714,628

4 Claims. (Cl. 196—14.35)

This invention relates to a method of preparing an aromatic-rich petroleum fraction and, more particularly, is directed to the preparation of an aromatic concentrate by extraction of a petroleum stock with a hydrocarbon-acetonitrile azeotrope and distillation of the resulting extract to yield a residual product of high aromatic content.

It has heretofore been recognized that hydrocarbon mixtures, such as petroleum and fractions thereof, containing two or more components of different degrees of saturation, for example, paraffins, olefins, naphthenes, aromatics, etc., can be separated by contacting with an agent, such as acetonitrile, capable of forming lower boiling azeotropes with one component than with another, or forming azeotropes with some but not all of the components. The usefulness of such azeotrope-forming agents has, in the past, been restricted due to their partial, if not complete, miscibility with the component with which they form azeotropes. They generally cannot be separated by settling means because they are miscible and they cannot be separated by simple distillation, since they form azeotropes. Much effort has heretofore been directed to various methods for separating such azeotropic mixtures; for example, the use of de-mixers, such as high boiling polar organic liquids and inorganic salts, has been suggested for bringing about a phase separation between the azeotrope-forming component and the azeotrope-forming agent.

It has now been found, in accordance with the present invention, that when acetonitrile is employed as an azeotrope-forming agent in effecting the separation of hydrocarbons, the resulting mixture of azeotrope-forming component and acetonitrile need not be subjected to separation, but that said acetonitrile-hydrocarbon azeotrope can be employed as an effective solvent in extracting aromatic components from hydrocarbon mixtures of the same. Particularly, the acetonitrile-hydrocarbon azeotrope is applicable in a combined solvent extraction and azeotropic distillation operation of a petroleum stock boiling below 500° F. to yield an aromatic-rich fraction of high solvent power. Accordingly, with the process of this invention, it has been found that a combined extraction with acetonitrile-hydrocarbon solvent, followed by azeotropic distillation of the resulting extract, provides a sharp separation of the aromatic and non-aromatic components of hydrocarbon mixtures, such as those occurring in petroleum stocks. The necessity of subsequently separating the acetonitrile-hydrocarbon azeotrope produced is hence eliminated since such azeotrope can be re-used directly as an effective solvent in accordance with the process described herein. Thus, it has been found that an aromatic-rich fraction of high solvent power is obtained by extracting an aromatic-containing petroleum stock with acetonitrile-hydrocarbon solvent, separating the resulting extract and raffinate phases, azeotropically distilling each of the phases separately to obtain, as residual products, an aromatic concentrate from the extract phase and a non-aromatic concentrate from the raffinate phase. The overhead product in each distillation is an azeotrope of acetonitrile and hydrocarbon which is recycled and employed for further extraction without necessitating separation of its components.

The process of this invention can be employed either as a batch operation or a continuous process and provides a useful method of preparing an aromatic-rich petroleum fraction of high solvent power. Generally, a petroleum stock boiling below 500° F. and preferably in the range of 200 to 400° F. will be treated. A particularly adaptable petroleum stock for use in the present invention is the 240 to 400° F. fraction of a one-pass catalytic gasoline.

Acetonitrile and the petroleum stock to be treated are mixed in a volume ratio of between about 1:1 and about 2:1 of acetonitrile to stock. The extraction can be carried out from very low temperatures up to about 83° C. at atmospheric pressure. Higher temperatures can be employed, if desired, with the use of pressure. With higher temperatures, it has been found desirable to employ small amounts of water in the solvent, thereby increasing its selectivity. The mixture, after treatment, is allowed to settle, forming two phases, the extract phase containing most of the aromatics present in the original stock and the raffinate phase containing a major proportion of the paraffins and naphthenes making up the original stock. In general, at room temperature, an initial contact time between the solvent and stock of about five minutes and a settling time of about fifteen minutes were found to be satisfactory. However, in some cases, due to the relatively close densities of the extract and raffinate, separation between phases was slow and required a longer settling time, up to one hour or longer.

After completion of the formation of the extract and raffinate phases, they are separated and distilled separately. The acetonitrile, in addition to being a selective solvent in the extraction operation, forms an azeotropic mixture with the hydrocarbons in the distillation step. The overhead, that is, the acetonitrile azeotrope, from both distillations may be combined, condensed and recycled if a continuous process is desired and reused for extraction purposes. The extract bottoms are aromatic concentrates having high solvent ability, while the raffinate bottoms are largely paraffinic gasolines. The solvency power of the aromatic solvents produced is indicated by the mixed aniline number, which is a measure of the aromaticity of the hydrocarbon mixture. Mixed aniline number specifications generally range from 75° up to 90° F. Therefore, if a product having a mixed aniline number of less than 75° F. is obtained, the product is satisfactory and can be blended with paraffins to generally meet any specifications.

A suitable system for carrying out a continuous process in preparing the aromatic-rich petroleum fraction of this invention is shown in the accompanying diagram, where acetonitrile introduced through conduit 1 and gasoline stock through conduit 2 are mixed and the mixture passed into the top of an orifice mixing-extraction tower 3. The gasoline-acetonitrile mixture is withdrawn from the bottom of the tower through outlet 4 and is conducted to a settler 5 in which a phase separation of the mixture takes place. The extract phase, containing a large proportion of the aromatics present in the original stock, is withdrawn from the bottom of the settler through outlet 6 and passes to fractionating tower 7 maintained at a temperature such that acetonitrile passes overhead as an acetonitrile-hydrocarbon azeotrope through conduits 8 and 9, condenser 15, and is recycled to extraction tower 3. Aromatic solvent concentrate is removed from the bottom of tower 7 through outlet 10.

The raffinate phase is withdrawn from the top of the settler through conduit 11 and conducted to fractionating tower 12 in which the acetonitrile-hydrocarbon azeotrope is removed as overhead through conduit 13, passes through conduit 9, condenser 15, and is recycled to the extraction tower. The bottoms product of tower 12, constituting a highly paraffinic and naphthenic gasoline, is withdrawn through outlet 14.

The following specific examples are representative of the results to be obtained in accordance with the process of this invention.

Example 1

One hundred sixty-four parts by weight of a 240–400° F. fraction of a one-pass catalytic gasoline were contacted with agitation at room temperature (22–25° C.) for a period of 5 minutes with 311 parts by weight of acetonitrile. After agitation, the mixture was permitted to settle for 15 minutes. During the settling period, the formation of two phases occurred. These phases were separated into an extract phase containing a major proportion of the acetonitrile employed and having dissolved therein the aromatic compounds present in the original gasoline and a minor proportion of the naphthene and paraffin hydrocarbons and a raffinate phase containing the remainder of the acetonitrile, together with most of the paraffins and naphthenes present in the original gasoline. The phases were then separately distilled, the overhead product in each distillation being an azeotrope of acetonitrile and hydrocarbon. The bottoms from the raffinate distillation was a gasoline which was less aromatic than the charge, while the bottoms from the extract distillation was an aromatic-rich fraction suitable for solvent purposes. Seventy-four per cent of the aromatics present in the original gasoline was extracted.

Properties of the charge stock, gasoline product, aromatic-rich fraction, and hydrocarbons in the acetonitrile azeotrope are summarized below:

|  | Charge Stock | Gasoline Product | Aromatic Fraction | Hydrocarbon in Azeotrope |
|---|---|---|---|---|
| Specific Gravity | 0.828 | 0.810 | 0.864 | 0.789 |
| Mixed Aniline No. °F | 97.5 | 119 | 72 | |
| Bromine No | 6.0 | | 1.4 | 10.3 |
| Aromatics, Percent Vol | 55.4 | | 86.3 | |

Example 2

One hundred forty parts by weight of the gasoline stock used in the above example were agitated for 5 minutes at room temperature with 276 parts by weight of the acetonitrile-hydrocarbon azeotrope obtained from the condensed overhead product of Example 1. After agitation, the mixture was permitted to settle for 2 hours. The phases were separated and distilled as in Example 1. Seventy-five per cent of the aromatics present in the original gasoline was extracted.

Properties of the charge stock, gasoline product, and aromatic-rich fraction are summarized below:

|  | Charge Stock | Gasoline Product | Aromatic Fraction |
|---|---|---|---|
| Specific Gravity | 0.828 | 0.809 | 0.859 |
| Mixed Aniline No. °F | 97.5 | 115 | 74 |
| Bromine No | 6.0 | 7.3 | 1.9 |
| Aromatics, Percent Vol | 55.4 | 31.6 | 82.7 |

Example 3

One hundred twenty-two parts by weight of the gasoline stock employed above were agitated for 5 minutes at room temperature with 231 parts by weight of acetonitrile-hydrocarbon azeotrope obtained from the condensed overhead product from Example 2. After agitation, the mixture was permitted to settle for 15 minutes, the phases separated and distilled as described above. The extract contained 72.5 per cent of the aromatics initially present in the original gasoline.

Properties of the charge stock, gasoline product, aromatic-rich fraction, and hydrocarbon in the acetonitrile azeotrope are summarized below:

|  | Charge Stock | Gasoline Product | Aromatic Fraction | Hydrocarbon in Azeotrope |
|---|---|---|---|---|
| Specific Gravity | 0.828 | 0.816 | 0.863 | 0.788 |
| Mixed Aniline No. °F | 97.5 | 112 | 71 | 121 |
| Bromine No | 6.0 | 6.8 | 3.1 | 10.8 |
| Aromatics, percent volume | 55.4 | 48.0 | 85.0 | 29.6 |

This example thus approximates the results which would be obtained in a continuous operation, as shown in the accompanying diagram.

We claim:

1. A method of preparing an aromatic hydrocarbon concentrate comprising contacting a petroleum stock containing aromatic and non-aromatic components with a quantity of acetonitrile-hydrocarbon solvent prepared as hereinafter described, said quantity being sufficient to selectively extract a major proportion of the aromatic components of said stock, separating the resulting extract and raffinate phases, distilling said extract phase and said raffinate phase separately, removing as overhead product in each distillation an acetonitrile-hydrocarbon azeotrope, recycling said overhead product for use as the aforesaid solvent to yield, as a result of the above selective extraction and azeotropic distillation, a bottoms product from the treatment of said extract phase of high aromatic content.

2. A method of preparing an aromatic hydrocarbon concentrate comprising contacting a petroleum stock containing aromatic and non-aromatic components with a quantity of acetonitrile hydrocarbon solvent prepared as hereinafter described, the ratio of solvent to said stock being between about 1:1 and about 2:1, separating the resulting extract and raffinate phases, distilling said extract phase and said raffinate phase separately, removing as overhead product in each distillation an acetonitrile-hydrocarbon azeotrope, recycling said overhead product for use as the aforesaid solvent to yield, as a result of the above selective extraction and distillation, a bottoms product from the treatment of said extract phase of high aromatic content.

3. A method of preparing an aromatic hydrocarbon concentrate comprising contacting a petroleum stock containing aromatic and non-aromatic components and boiling below 500° F., with a quantity of acetonitrile-hydrocarbon solvent prepared as hereinafter described, said quantity being sufficient to selectively extract a major proportion of the aromatic components of said stock, separating the resulting extract and raffinate phases, distilling said extract phase and said raffinate phase separately, removing as overhead product in each distillation an acetonitrile-hydrocarbon azeotrope, recycling said overhead product for use as the aforesaid solvent to yield, as a result of the above selective extraction and azeotropic distillation, a bottoms product from the treatment of said extract phase of high aromatic content.

4. A method of preparing an aromatic hydrocarbon concentrate comprising contacting a petroleum stock containing aromatic and non-aromatic components and having a boiling range from about 240° F. to about 400° F., with a quantity of acetonitrile-hydrocarbon solvent prepared as hereinafter described, said quantity being sufficient to selectively extract a major proportion of the aromatic components of said stock, separating the resulting extract and raffinate phases, distilling said extract phase and said raffinate phase separately, removing as overhead product in each distillation an acetonitrile-hydrocarbon azeotrope, recycling said overhead product for use as the aforesaid solvent to yield, as a result of the above selective extraction and azeotropic distillation, a bottoms product from the treatment of said extract phase of high aromatic content.

WILLIAM I. DENTON.
RICHARD B. BISHOP.

REFERENCES CITED

The following references are of record in the file of this patent:

UNITED STATES PATENTS

| Number | Name | Date |
|---|---|---|
| 2,085,546 | Roelfsema | June 29, 1937 |
| 2,290,636 | Deanesly | July 21, 1942 |

FOREIGN PATENTS

| Number | Country | Date |
|---|---|---|
| 441,104 | Great Britain | Jan. 13, 1936 |